United States Patent [19]
Rodriguez-Leon

[11] Patent Number: 5,871,551
[45] Date of Patent: Feb. 16, 1999

[54] PROCESS FOR THE PREPARATION OF ANHYDROUS SODIUM SULFATE

[75] Inventor: Edgar Rodriguez-Leon, Saltillo, Mexico

[73] Assignee: Industria Del Alcali, S.A.DE C.V., Nuevo Leon, Mexico

[21] Appl. No.: 758,242

[22] Filed: Nov. 27, 1996

Related U.S. Application Data

[63] Continuation-in-part of Ser. No. 272,941, Jul. 11, 1994, abandoned, which is a continuation-in-part of Ser. No. 995,075, Dec. 22, 1992, abandoned.

[30] Foreign Application Priority Data

Dec. 27, 1991 [MX] Mexico ................................ 9200054

[51] Int. Cl.$^6$ ..................................................... C01D 5/00
[52] U.S. Cl. ...................... 23/302 T; 23/298; 23/302 R; 423/551; 423/553
[58] Field of Search .............................. 23/302 R, 302 T, 23/298, 297; 423/551, 553, 208

[56] References Cited

U.S. PATENT DOCUMENTS

| | | | |
|---|---|---|---|
| 392,286 | 11/1888 | Pemberton, Jr. | 423/553 |
| 668,671 | 2/1901 | Baker et al. | 23/298 |
| 1,562,863 | 11/1925 | Broadbridge et al. | 423/208 |
| 1,673,471 | 6/1928 | Purdy | 423/551 |
| 2,054,520 | 9/1936 | Pierce, Jr. | 23/302 |
| 3,556,596 | 1/1971 | MacWilliams et al. | 299/5 |
| 4,179,493 | 12/1979 | Sadan | 423/553 |
| 4,486,283 | 12/1984 | Tejeda | 204/301 |

FOREIGN PATENT DOCUMENTS

| | | | |
|---|---|---|---|
| 1148219 | 5/1963 | Germany | 423/553 |
| 2904345 | 8/1990 | Germany | 423/553 |
| 767029 | 9/1990 | U.S.S.R. | 23/302 T |
| 1611866 | 12/1990 | U.S.S.R. | 23/302 T |

OTHER PUBLICATIONS

Kirth–Othmer, "Encyclopedia of Chemical Technology", 3rd ed., vol. 21, TP9 E68, 1978 (no month), pp. 245–256.

Dolbear et al., "Industrial Minerals & Rocks", 2nd ed., TN 145 as 1949 (no month) pp. 945–964.

Chilton, "Crystallization: key step in sodium sulfate process," Chemical Engineering, Aug. 11, 1958, pp. 116–119.

Primary Examiner—Ngoc-Yen Nguyen
Attorney, Agent, or Firm—Abelman, Frayne & Schwab

[57] ABSTRACT

A process for the preparation of anhydrous sodium from a thenardite ore containing sodium sulfate comprising the steps of: crushing the thenardite ore; lixiviating the crushed ore in a first lixiviation step with water or with an exhausted solution from a succeeding step, at a temperature between about 28° C. and 40° C., obtaining a suspension comprising a sodium sulfate saturated solution, sludges and insoluble material, settling the sludges and insoluble material from the saturated solution to separate a clarified solution; crystallizing the clarified saturated solution in a first crystallization step at a temperature between 32° C. and 20° C., maintaining the height of the solution not exceeding about 15 centimeters, to obtain a Glauber salt with large crystals of sodium sulfate and ten molecules of water. When the clarified saturated solution is crystallized, an exhausted solution is produced which is drained and recycled back to the first lixiviation step. Melting the crystals, free from solution, at a temperature about 60° C. to dissolve the sodium sulfate crystals in their own crystallization water, to obtain a suspension comprising a sodium sulfate saturated solution with a density of 1.335 g/cc and crystals of anhydrous sodium sulfate in a proportion of about 17% by weight of the Glauber salt; and settling the crystals of anhydrous sodium sulfate. The clarified saturated solution of the previous step is recycled in a second crystallization step to separate the anhydrous sodium sulfate and finally a drying step is carried out to obtain anhydrous sodium sulfate crystals.

4 Claims, 1 Drawing Sheet

PROCESS FOR THE PREPARATION OF ANHYDROUS SODIUM SULFATE

This application is a continuation-in part of application Ser. No. 08/272,941 filed on Jul. 11, 1994, now abandoned, which is a continuation-in-part of application Ser. No. 07/995,075 filed on Dec. 22, 1992, now abandoned.

BACKGROUND OF THE INVENTION

This invention relates to a process for the preparation of anhydrous sodium sulfate and, more specifically, to a process for the benefitiation of thenardite ores to produce anhydrous sodium sulfate.

The known conventional process for the production of sodium sulfate, begins with from a brine which is extracted from the underground and stored in a reservoir and from there it is conducted to a crystallizer wherein, by cooling, crystals are produced in the form of a fine powder of sodium sulfate hydrated with ten molecules of water, known as Glauber salt, which is settled, then filtered and conducted to a reservoir wherein it is melted to dissolve the crystals of sodium sulfate in its own hydrating water, to produce a saturated solution of sodium sulfate with 17% of solids, which is then partially evaporated to obtain a suspension of anhydrous sodium sulfate with 20% of solids in a saturated solution, said suspension is then settled and centrifuged to concentrate the solids of anhydrous sodium sulfate which are separated and dried recycling the remaining saturated solution back to the evaporation step.

In said conventional process the crystallization of the Glauber salt is carried out by cooling it at about 20° C. to about 0° C. in a special crystallizer, including additional equipment such as boilers, cooling towers, boosters, etc.

The evaporation step has been considered as strictly necessary to concentrate the solids of anhydrous sodium sulfate up to 20%.

It is well known that there are thenardite ores in several deposits around the world in different concentrations, some of which have a higher content of sodium sulfate than that of the brine deposits.

However, one of the problems associated with the production of anhydrous sodium sulfate from an ore such as the thenardite is the quality (fineness). It is well known that the anhydrous sodium sulfate obtained by the known processes, contain small quantities (less than 1%) of fine clay, that product a dark aspect in the solution.

Another disadvantage of the known processes to produce anhydrous sodium sulfate is the investment in equipment that is very expensive and sophisticated.

With this backgrounds, the inventor began his research with respect to a deposit of thenardite ore, located in Bacadehuachi in the Mexican state of Sonora to extract anhydrous sodium sulfate from the ore to be used mainly in the production of detergents, paper and glass.

Based on the curve of solubility for sodium sulfate, the inventor found in his research that it was possible to obtain a 32% saturated solution from the ore and that it was necessary to lixiviate the ore with water at a temperature of 32° C., because at a higher temperature, a decay in the solubility was achieved.

At a temperature below 32° C., the Glauber salt crystallizes and, in the process of the present invention, such crystallization is carried out in an open reservoir with considerable savings in energy because of the ambient conditions of the place of the deposit wherein the ambient temperature changes from 30° C. or 40° C., to 10° C. or 20° C. at night, which cooling helps in the natural crystallization of the Glauber salt.

Moreover, the inventor found that it is important to crystallize the solution in a reservoir, wherein it is cooled overnight at a temperature between about 10° C. to about 20° C., taking care that the height of the solution within the reservoir does not exceed approximately 15 cm., to produce the Glauber salt in the form of large crystals which allows its separation by simply draining.

This Glauber salt is then melted at a temperature between about 40° C. and 60° C. and is dissolved in its own crystallization water to crystallize the anhydrous sodium sulfate which is separated and dried.

It is also important that the saturated solution resulting from the melting of the Glauber salt, by recycled to the crystallization step instead of evaporating it, as in the conventional brine process, to avoid the need for evaporation equipment and the energy consumption involved.

SUMMARY OF THE INVENTION

It is therefore a main object of the present invention, to provide a process for the preparation of anhydrous sodium sulfate from thenardite ore containing sodium sulfate.

It is also a main object of the present invention, to provide a process for the preparation of anhydrous sodium sulfate, of the aforesaid nature, by means of grinding and lixiviation of the thenardite ore and crystallization of a Glauber salt which melts in its own crystallization water, to obtain anhydrous sodium sulfate in a saturated solution, recycling the saturated solution remaining from the crystallization step, to avoid the need of the evaporation step of the conventional process.

It is an additional object of the present invention, to provide a process for the production of anhydrous sodium sulfate, of the aforesaid nature, in which the energy consumption and investment in equipment are reduced, both in the Glauber salt crystallization and in the crystallization of the melting thereof, because the remaining saturated solution is recycled back to the crystallization step.

It is other object of the present invention to provide a process for the production of anhydrous sodium sulfate, in which the anhydrous sodium sulfate is produced with a high purity 99.0% and a grade high of whiteness, diminishing the investment in approximately a 60% and the manufacture costs in approximately 40%.

These and other objects and advantages of the present invention will be readily apparent for those skilled in the art, from the following detailed description of the invention and accompanying drawing.

DETAILED DESCRIPTION OF THE INVENTION

Figure 1:
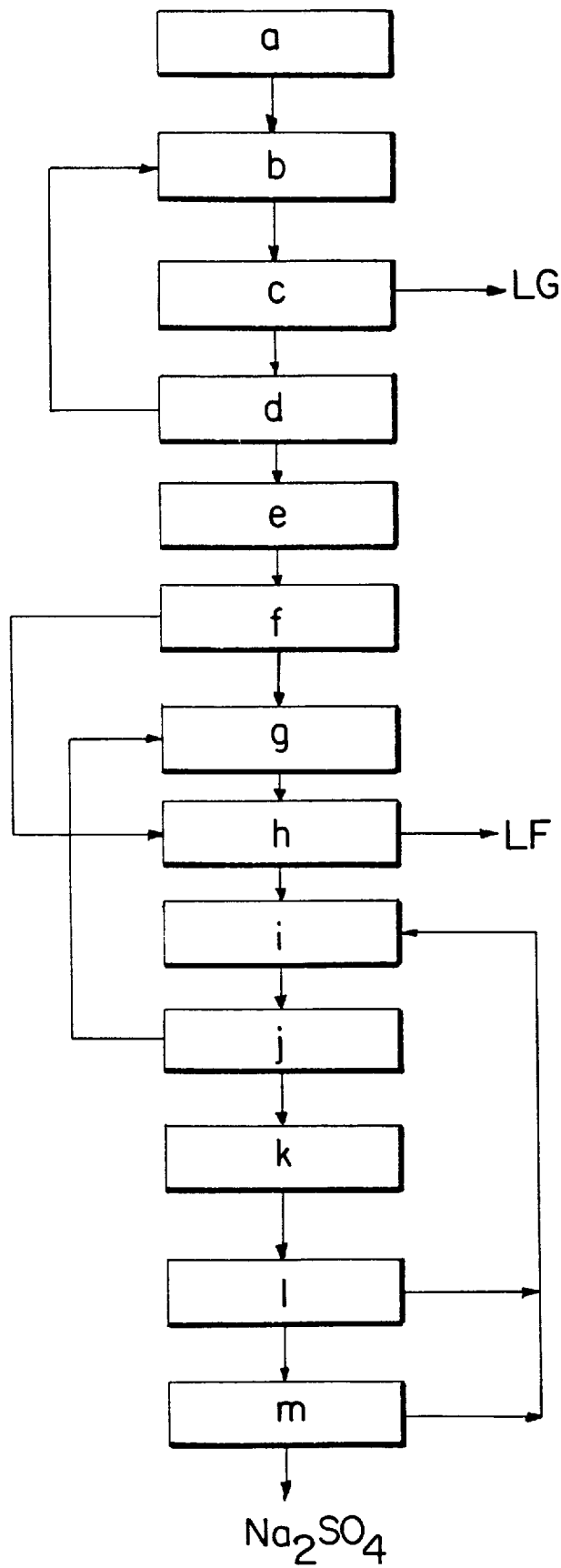
FIG. 1 is a block diagram of the process for the production of anhydrous sodium sulfate from thenardite ores containing sodium sulfate.

Referring to FIG. 1 there is disclosed a process for the production of anhydrous sodium sulfate from a thenardite ore having a 65% sodium sulfate fineness, consisting essentially of the steps of:

a) crushing the thenardite ore to reduce its size from approximately 38 centimeters to less than 0.5 centimeters primarily by means of a jaw crusher and thereafter in a roll crusher;

b) lixiviating the crushed ore with water or with an exhausted solution from a following or succeeding step in the process, at a temperature between about 28° C. and 40° C., in a tank having agitation, until the solution reaches a density of 1.3 g/cc to obtain a suspension comprising a sodium sulfate saturated solution, sludges and insoluble material;

c) settling the sludges from the suspension to separate a clarified saturated solution and separating the coarse sludges LG;

d) crystallizing the clarified saturated solution in a first crystallization step in a reservoir or pond open to the environment, wherein it is cooled to an ambient temperature between 32° C. and 20° C., while taking care to maintain the height of the solution so it does not exceed from about 15 centimeters to obtain a Glauber salt as large crystals (sodium sulfate with the molecules of water ($Na_2SO_4.10H_2O$)), and an exhausted solution having a density of approximately 1.21 g/cc, which is drained and recycled back to the first lixiviation step (b);

e) melting the crystals ($Na_2SO_4.10H_2O$) at a temperature about 60° C. to dissolve the crystals ($Na_2SO_4.10H_2O$) in their own crystallization water, obtaining a suspension containing a saturated solution of sodium sulfate with a density of 1.335 g/cc and crystals of anhydrous sodium sulfate in a proportion of about 17% by weight of the Glauber salt from which it is originated;

f) settling anhydrous sodium sulfate crystals from the suspension to remove a saturated solution of density 1.335 g/cc and obtaining a suspension of anhydrous sodium sulfate crystals with 35% of solids, by weight;

g) lixiviating the crystals of anhydrous sodium sulfate with an exhausted solution that is obtained after a succeeding crystallization step i) is carried out and to obtain a saturated solution;

h) filtering the saturated solution of the lixiviating step g) together with the saturated solution of the settling step f) to obtain a clarified saturated solution and separating fine sludges LF;

i) crystallizing the clarified saturated solution obtained in step h), in a second crystallization step in a second reservoir or pond open to the environment, wherein it is cooled to a temperature between 40° C. and 20° C., while taking care to maintain the height of the solution so it does not exceed from about 15 centimeters to obtain a Glauber salt as large crystals (sodium sulfate with ten molecules of water ($Na_2SO_4.10H_2O$)), and an exhausted solution having a density of approximately 1.21 g/cc;

j) draining the exhausted solution to separate the large crystals (sodium sulfate with ten molecules of water ($Na_2SO_4.10H_2O$)) and recycling said exhausted solution to the lixiviation step g);

k) melting the large crystals ($Na_2SO_4.10H_2O$) at a temperature between about 40° C. and 60° C. to dissolve the crystals ($Na_2SO_4.10H_2O$) in their own crystallization water, obtaining a suspension containing a saturated solution of sodium sulfate with a density of 1.335 g/cc and anhydrous sodium sulfate crystals in a proportion of about 17% by weight of the Glauber salt from which it is originated;

l) settling the anhydrous sodium sulfate crystals from the suspension to separate a saturated solution of density 1.335 g/cc and a suspension of anhydrous sodium sulfate crystals with 35% of solids by weight, and producing a saturated solution which is recycled back to the crystallization step i);

m) centrifuging the suspension with 35% of solids to reach a 90% of solids content and removing the saturated solution for recycling to the crystallization step i); and, n) drying the suspension with 90% solids content which comes from the centrifuging of step m) in a hearth furnace having an adjacent boiler to heat the drying air which is distributed in each hearth of the furnace to obtain anhydrous sodium sulfate with a moisture content of less than 0.02%, which is cooled prior to its packaging.

In accordance with this process, five (5) aleatory samples of thenardite ore from the Bacadehuachi deposit in the Mexican state of Sonora with the following composition were tested.

| ANALYSIS OF THE FIVE ORE SAMPLES | | | | | |
| --- | --- | --- | --- | --- | --- |
| | SAMPLES IN WEIGHT PERCENT | | | | |
| COMPONENTS | 1 | 2 | 3 | 4 | 5 |
| $Na_2SO_4$ | 83.50 | 95.70 | 96.77 | 95.07 | 97.72 |
| $Ca_2SO_4$ | 4.00 | 2.34 | 1.50 | 1.55 | 1.47 |
| Insolubles | 12.43 | 1.29 | 1.70 | 3.32 | 0.76 |

The tests were conducted in a pilot plant which operated with a capacity of 130 Kg of anhydrous sodium sulfate per day.

The pilot plant was operated in Bacadehuachi in the summer to evaluate the effect of the high temperatures, in the crystallization of Glauber salt, which is considered as the heart of the process.

The equipment used for crushing the ore was a jaw crusher provided with a 3 HP motor and a roller crusher with a motor of 7 HP, both with a capacity of 1 TPH which consumed 1.5 KWh/ton.

Lixiviation took place in a reservoir of 19.8 dm wide and 23.82 dm length, equipped with a manual paddle for agitation.

Settling took place in a reservoir similar to that for lixiviation. This operation took about 6 hours.

Crystallization took place in a reservoir of 30 dm wide, 60 dm. length and a variable height of 6 dm in one edge to 5 dm in the other edge. The solution was placed within the reservoir up to a height of 15 centimeters to crystallize overnight to produce large Glauber crystals.

The remaining solution after the separation of the crystals of the Glauber salt, was stored in a reservoir from which it was recycled to the lixiviation reservoir and the resulting crystals were first placed in a mesh to remove the trapped solution and, thereafter, in a galvanized sheet plate bucket from which they were melted at about 60° C.

The product obtained from these five tests had the following analysis:

| | SAMPLES IN WEIGHT PERCENT | | | | |
|---|---|---|---|---|---|
| | 1 | 2 | 3 | 4 | 5 |
| | | | DATE | | |
| COMPONENTS | Oct 11 | Oct 15 | Oct 21 | Oct 28 | Oct 31 |
| $Na_2SO_4$ | 99.840 | 99.750 | 99.840 | 99.870 | 99.860 |
| $Ca_2SO_4$ | 0.051 | 0.054 | nd | nd | nd |
| $MgSO_4$ | 0.012 | 0.039 | 0.063 | 0.065 | 0.068 |
| NaCl | 0.038 | 0.036 | 0.031 | 0.031 | 0.033 |
| FeO (ppm) | 28.170 | 14.300 | 21.400 | 21.700 | 8.000 |
| Insolubles | 0.055 | 0.097 | 0.060 | 0.030 | 0.040 |
| Moisture | 0.010 | 0.002 | 0.013 | 0.016 | 0.014 |
| Density (g/cc) | 1.190 | 1.630 | 1.160 | 1.060 | 1.210 |

The whiteness and chemical analysis of the product demonstrated that it was competitive in the international markets for its use in the production of detergents and in the paper and glass industries.

It should be understood that the scope of the instant invention is not limited to the specific examples of process and equipment above described and that those skilled in the art will be able to make variations in the process steps and operation conditions of the instant invention and that these variations come within the spirit and scope of the invention as claimed hereafter.

I claim:

1. A process for the preparation of anhydrous sodium sulfate from a thenardite ore containing sodium sulfate, consisting essentially of the steps of:

a) crushing the thenardite ore;

b) lixiviating the crushed ore in a first lixiviating step with water or an exhausted solution from a following or succeeding step, at a temperature between about 20° C. and 40° C., to obtain a suspension comprising a sodium sulfate saturated solution, sludges and insoluble material;

c) settling the sludges and insoluble material from the saturated solution of step b) to separate a clarified saturated solution;

d) crystallizing the clarified saturated solution of step c) in a first crystallization step, at a temperature between 32° C. and 20° C., while maintaining the height of the solution so it does not exceed about 15 centimeters, to obtain a Glauber salt which has crystals of sodium sulfate with ten molecules of water and an exhausted solution with the density of about 1.21 g/cc, wherein the exhausted solution is drained and recycled back to the first lixiviation step;

e) melting the $Na_2SO_4.10H_2O$ crystals, at a temperature of about 60° C. to dissolve the $Na_2SO_4.10H_2O$ crystals, at a temperature of about 60° C. to dissolve the $Na_2SO_4.10H_2O$ crystals in their own crystallization water, to obtain a suspension comprising a sodium sulfate saturated solution with a density of 1.335 g/cc and crystals of anhydrous sodium sulfate in a proportion of about 17% by weight of the Glauber salt from which it originated;

f) settling anhydrous sodium sulfate crystals from the suspension of step e) and removing a part of the sodium sulfate saturated solution and thereby obtaining a suspension of anhydrous sodium sulfate crystals with 35% of solids by weight;

g) lixiviating the crystals of anhydrous sodium sulfate in a second lixiviation step, with an exhausted solution obtained after a succeeding crystallization step is carried out to obtain a saturated solution;

h) filtering the saturated solution of the second lixiviating step together with the part of the saturated solution removed from step f) to obtain a clarified saturated solution;

i) crystallizing the clarified saturated solution of the filtering step h), in a second crystallization step and maintaining the height of the solution so it does not exceed about 15 centimeters, to obtain a Glauber salt which has crystals of sodium sulfate with ten molecules of water and an exhausted solution, wherein the exhaust solution is drained;

j) melting the crystals of $Na_2SO_4.10H_2O$ at a temperature about 40° C. and 60° C. to dissolve the crystals $Na_2SO_4.10H_2O$ in their own crystallization water, obtaining a suspension containing a saturated solution of sodium sulfate with a density of 1.335 g/cc and anhydrous sodium sulfate crystals in a proportion of about 17% by weight of the Glauber salt from which it originated;

k) settling the anhydrous sodium sulfate crystals from the suspension of step j) and separating a part of the saturated solution of density of 1.335 g/cc and thereby obtaining a suspension of anhydrous sodium sulfate crystals with 35% solids, by weight, and the separated saturated solution is recycled back to the second crystallization step;

l) and drying the suspension of anhydrous sodium sulfate crystals of step k) to obtain anhydrous sodium sulfate.

2. The process as claimed in claim 1, wherein the exhausted solutions that are obtained after the first and second crystallization steps are stored in separate reservoirs and they are recycled respectively to the first and second lixiviation steps and the Glauber salt crystals obtained in steps d) and i) are placed in meshes to remove residues of the exhausted solution from the crystals.

3. The process as claimed in claim 1, wherein step l) comprises: drying the crystals of anhydrous sodium sulfate in a hearth furnace to obtain anhydrous sodium sulfate product with a moisture content of less than 0.02%.

4. The process as claimed in claim 1, wherein step k) further comprises the steps of centrifuging the suspension with 35% of solids to reach a 90% solids content and recycling the saturated solution which is removed by the centrifuging step to the second crystallization step.

* * * * *